Nov. 18, 1930.     C. A. CAMPBELL     1,781,747
FEED VALVE FOR AIR BRAKES
Filed Sept. 24, 1927      2 Sheets-Sheet 1
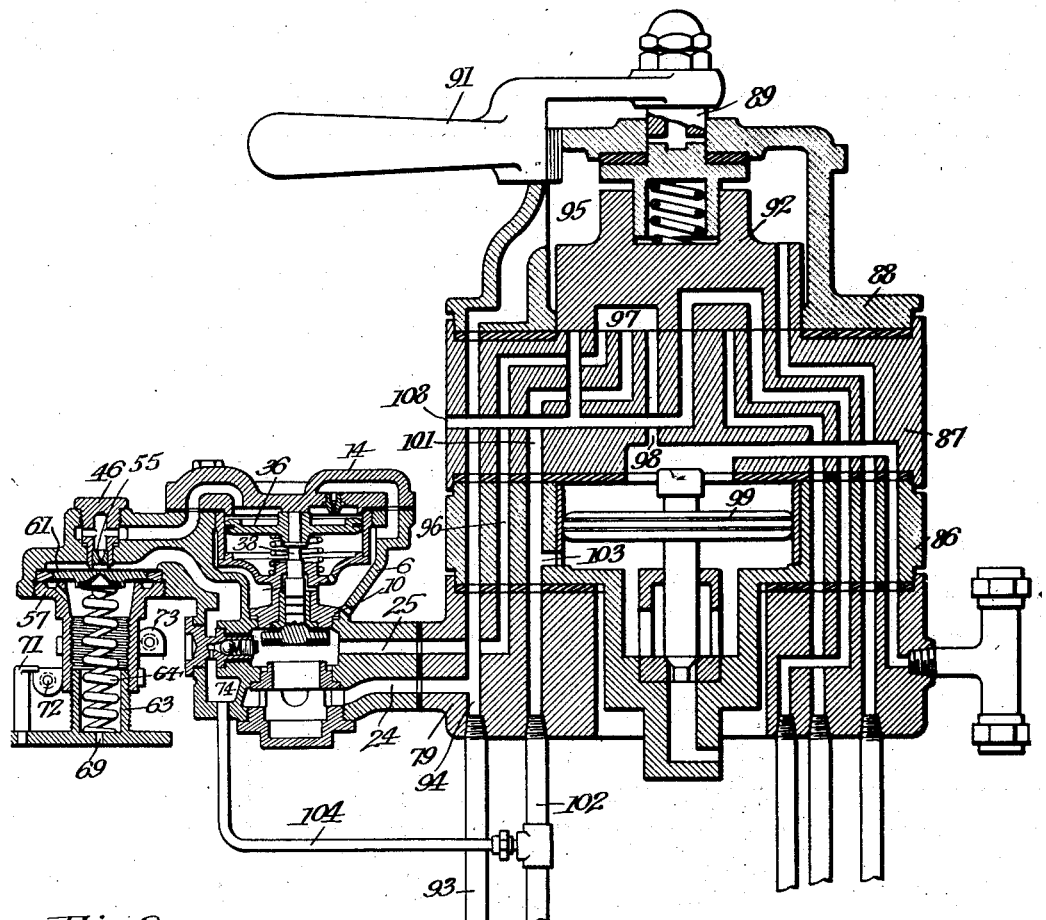
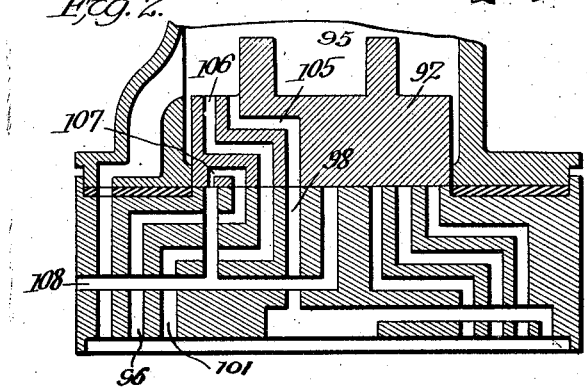
Inventor:
Charles A. Campbell,
Attorneys Nov. 18, 1930.   C. A. CAMPBELL   1,781,747
FEED VALVE FOR AIR BRAKES
Filed Sept. 24, 1927    2 Sheets-Sheet 2
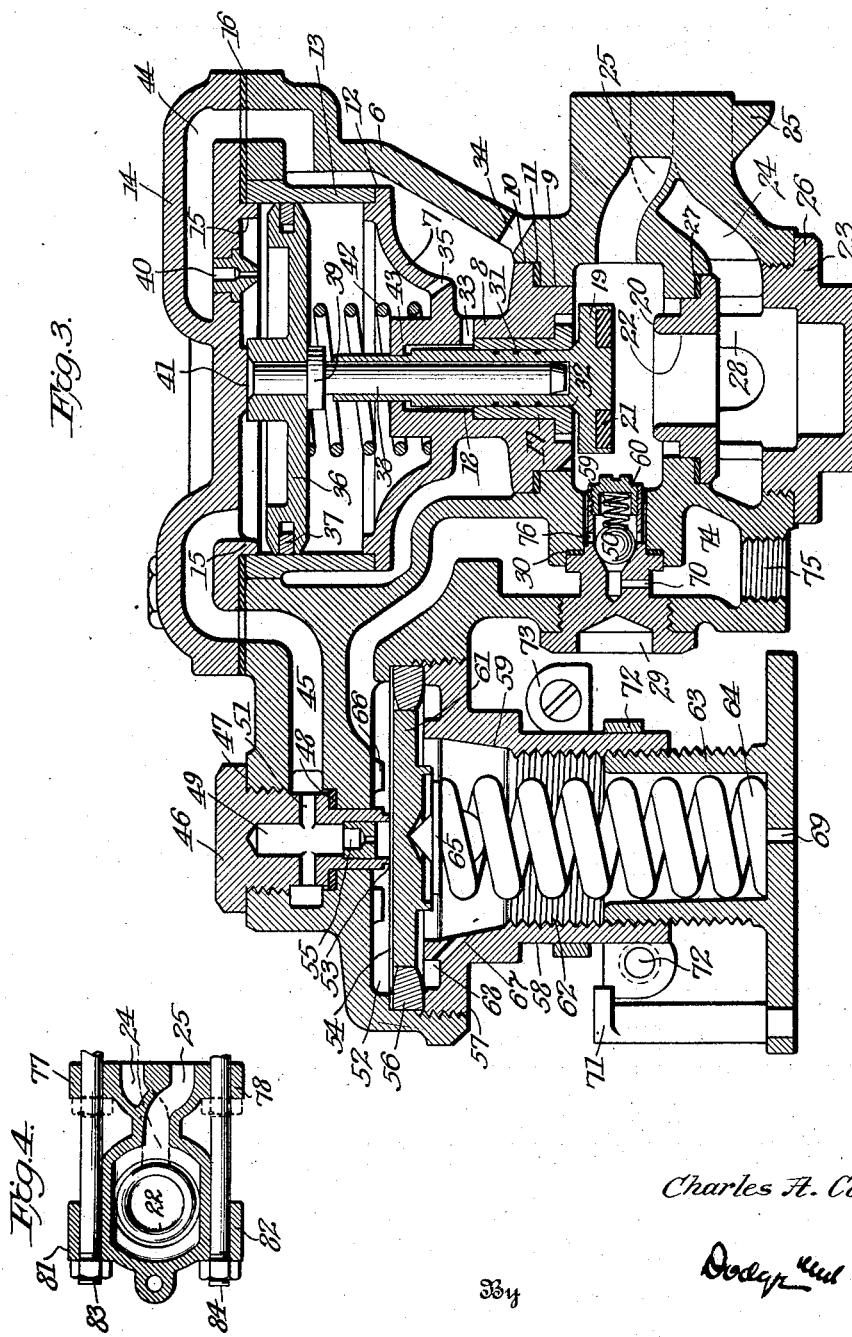
Inventor:
Charles A. Campbell
By Dodge and Sons
Attorneys.

Patented Nov. 18, 1930

1,781,747

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

FEED VALVE FOR AIR BRAKES

Application filed September 24, 1927. Serial No. 221,810.

This invention relates to air brakes and particularly to the feed valve which, under the control of the engineer's brake valve, maintains the brake pipe pressure when the engineer's brake valve is in running position.

One of the most important objects of the invention is so to connect the feed valve with the engineer's brake valve and the brake pipe that a close regulating action is secured at all times.

Other details of invention reside in features of construction and mounting of the valve which contribute to ease of construction and certainty of action and facilitate the dismounting of various units when necessary, without requiring dismounting of related units.

The preferred embodiment of the invention is illustrated in the accompanying drawings, in which Fig. 1 is a diagrammatic vertical axial section of a standard model L brake valve with the improved feed valve attached. The brake valve is shown in running position.

Fig. 2 is a fragmentary diagrammatic view illustrating a portion of the engineer's brake valve, but showing the rotary valve in the release position.

Fig. 3 is a vertical axial section of the feed valve shown in Fig. 1 but on a larger scale.

Fig. 4 is a detail fragmentary section showing the attaching lugs for mounting the feed valve on the engineer's brake valve. (Drawn on a reduced scale.)

In Figs. 3 and 4 the main ports of the feed valve are shown as actually constructed, i. e., in different vertical planes.

In Figs. 1 and 2 the ports and passages are conventionally shown as all in one plane to facilitate explanation, but other arrangements may be, and ordinarily will be, adopted.

Referring first to Fig. 3, body 6 of the feed valve is cast in one piece and its general form can best be understood by reference to the drawings.

Mounted in the body 6 is a spider 7 which has a central hub portion 8 terminating at its lower end in a sleeve 9 which makes a sliding fit with a portion of the body 6. Above the sleeve 9 is a flange 10. This seats on a gasket 11 which rests on a shoulder formed in the body 6 to receive it. At its upper end the spider 7 is formed with an annular shoulder 12 which positions the cylinder bushing 13 relatively to the spider.

The cylinder bushing 13 makes a sliding fit within the body 6 and is clamped in place by a head or cover plate 14. The head 14 is provided with a centering flange 15 which engages the cylinder bushing 13 while a gasket 16 serves to produce a tight joint between the head 14 on the one hand and the body 6 and bushing 13 on the other. The pressure transmitted through the bushing 13 and spider 7 is exerted on the gasket 11, thus producing a tight seal between the flange 10 and the body 6.

The hub 8 is counterbored to receive bushing 17, preferably of brass, and in this bushing slides the stem 18 of the main feed valve 19. Above bushing 17 stem 18 is reduced in diameter and is guided by a portion of spider 7. This reduction of diameter serves further to check leakage.

The feed valve 19 has an annular seating surface 21, of soft metal, such as Babbitt metal, and this coacts with a seat 20 formed on the upper end of removable seat bushing 22. Bushing 22 is retained by projecting spaced lugs 28 on threaded plug 23. Valve 19 and seat 20 control a connecting passage between the inlet passage 24 and the discharge passage 25 formed in body 6.

The member 23 has a flange 26 which makes a seal with the outer wall of the body 6, while a gasket 27 produces a tight seal between the member 22 and that portion of the body 6 which intervenes between the passages 24 and 25. The construction is such that the members 22 and 23 and the valve 19 may all be withdrawn without disturbing other portions of the mechanism.

The stem 18 is provided with the usual sealing grooves 31 and with a conical valve surface 32 which seats against the conical seat formed on the lower end of the bushing 17. Thus leakage past the stem is minimized at all times and in the full open position of the valve is precluded. Such leakage as occurs is vented to the atmosphere through port 33 in hub 8 and port 34 in body 6. There is also a port 35 through the spider 7 which vents the space below the valve actuating piston to atmosphere by way of port 34. This valve actuating piston is shown at 36 and has the usual packing ring 37. It is mounted on a stem 38 against a shoulder or collar 39 and is retained by riveting the end of the stem as indicated at 41. The stem 38 is materially smaller than the stem 18 which is counterbored to receive it. The counterbore is so deep that stem 38 enters into thrust relation with valve stem 18 at or below the lower end of the guide bushing 17. Thus resistance to wobbling of the valve and a reduced tendency of the valve to wobble are secured.

The piston 36 is constantly urged upward by a spring 42. The lower end of the spring is positioned by a hub portion 43 formed on the spider 7.

A choke plug 40 is mounted in the head 14 and offers a bleed communication of definite effective area from the space at the upper to the space at the lower side of the piston 36 by way of passage 44 in head 14 and casting 6. This plug is preferably made of hardened non-corrosive alloy steel and is formed with a sharp edge at the entrance (lower) end of the bleed port so as to minimize the tendency of dust to accumulate at such entrance. The use of hardened non-corrosive alloy steel for the choke port is for the purpose of permitting this port to be cleaned without danger of enlarging the port, the maintenance of its size being an important factor in the precise functioning of the feed valve.

The position of piston 36 depends upon the rate of supply of air to the space above the piston, the maximum rate being greater than the discharge capacity of the port in the choke plug. The air discharging through the choke port escapes to the atmosphere by way of port 34. The supply of air to the space above piston 36 is controlled by a second choke plug and a loaded diaphragm valve, and arrives through passage 45 which is formed partly in the body 6 and partly in the removable cap 14.

Projecting through the port 45 and threaded into the body 6 is a valve seat member 46 which seals with the body 6 above port 45 by means of the flange 47 and which seats on a gasket 48 by which means it makes a tight joint with the body 6 below the port 45. The member 46 has an axial port 49 and communicating radial ports 51 which lead to the passage 45. The tubular end of the member 46 projects into a circular chamber 52 formed in the body 6 and there terminates in an annular seat 53 against which a diaphragm 54 at times seats to perform a valve function.

Fixed in the bore 49 of the member 46 is a choke plug 55, similar to the choke plug 40 but having a larger capacity. This plug is preferably located closely adjacent the annular valve seat 53 so that its throttling action is at a point close to the seat which is favorable to quick opening action of the valve diaphragm. The choke plug 55 is likewise preferably made of hardened non-corrosive steel.

The diaphragm 54 seats against a shoulder defining the lower margin of the chamber 52 and is clamped and sealed in place by a ring 56 and clamping nut 57 which is threaded into the body 6 and bears upon the ring 56. Projecting downward from the nut 57 is a tubular spring box 58. The lower portion of the spring box 58 is threaded, as shown at 62, to receive an adjustable spring seat 63. Mounted in the spring seat 63 is the thrust spring 64 which engages at its upper end a thrust member 65. This thrust member has a conical end seated in a more obtuse conical recess in the diaphragm thrust member 61 and thus imparts to the diaphragm through such thrust member the thrust of the spring 64 centrally and in a right line without any lateral deflecting tendency. This arrangement insures accurate deflection of the diaphragm 54, as the spring 64 and the pressure in the chamber 52 react against each other.

Since the member 46 is removable and may be removed at any time, stop lugs 66 are provided in the diaphragm chamber to limit the upward motion of the diaphragm 54 when the member 46 is removed. The lugs 66 are so dimensioned that the diaphragm 54 does not contact with them as the diaphragm is flexed in the normal functioning of the device.

The space below the diaphragm 54 is vented to the atmosphere and drained of moisture by drain ports 67 which leads downward from an annular groove 68 formed in the clamping nut 57 and by a port 69 which is formed in the extreme lower end of the spring seat 63.

The stress on the spring 64 is adjusted by turning the spring seat 63 and in many classes of service it is necessary to set quickly for either of two adjustments, one for use with freight brakes and the other for use with passenger brakes. To permit this the spring seat 63 is formed with an upward projecting stop lug 71. Its motion is limited by two adjustable collars 72 and 73, each of which is adjustable vertically and angularly on the outside of the spring box 58. The stop collars 72 and 73 are in the form of split collars clamped by screws and they may be so set by longitudinal and angular motions of the two collars as to limit the adjusting motion of the spring seat 63 between any desired limits within the range of motion of the spring seat. It will be observed that the lug 71 moves in a spiral path so that the stop collars 72 and 73 may be set to permit any desired range of motion.

The space 52 above diaphragm 54 is connected by a passage 74 with a threaded opening 75. A plug 29 is threaded into body 6 and has a portion extending through passage 74 but not obstructing such passage. It makes a tight joint with body 6 by means of a flange and by means of gasket 30. Mounted in a recess in the end of plug 29 is a ball check valve 50 urged closed by spring 59 whose tension is adjusted by nut 60. The check 50 permits flow from passage 74 to discharge port 25 by way of choke 70 and ports 76 but closes against back flow.

Turning now to Fig. 4, it will be observed that the body 6 is formed with a pair of lugs 77 and 78, by means of which the feed valve may be connected to the pipe bracket portion 79 of an engineer's brake valve (see Fig. 1). Inasmuch, however, as certain types of feed valves now in common use require very long studs, the body 6 is formed with a second pair of lugs 81 and 82 having openings alined with the openings in the lugs 77 and 78. Thus it is immaterial whether the pipe bracket of the engineer's brake valve is provided with long or short studs. If the studs are short the lugs 77 and 78 are used. If the studs are long they merely project through the lugs 77 and 78, then through the lugs 81 and 82 and are clamped by nuts seating on lugs 81 and 82 (see Fig. 4). This construction avoids the necessity of interchanging studs when substituting this type of feed valve for either of two others. To preclude the mounting of the feed valve in inverted position a positioning lug 85 is provided.

The structure just described has a number of practical advantages from the standpoint of manufacture and assembly. Both valve seats may be withdrawn without dismounting other mechanism. When the member 46 is withdrawn the diaphragm is sustained against excessive flexure. The piston and cylinder bushing may be readily removed and replaced without disturbing other parts of the mechanism. It is feasible to make the cylinder bushing 13 of brass and the spider 7 of cast iron, or other inexpensive material. All vent ports are so located as to drain moisture from the device, and finally each part is readily accessible.

The feed valve above described is available for general use with engineer's brake valves of different types, but in order to explain its operation it will be described as applied to a standard model L engineer's brake, having reference to Figs. 1 and 2.

Mounted on the pipe bracket portion 79 of the brake valve is the equalizing piston portion 86 upon which is mounted the rotary valve seat portion 87, as is well understood. Upon the portion 87 is a cap 88 which guides the stem 89 and handle 91. The usual rotary valve controlled by the handle 91 is shown at 92 and has the usual ports and recesses coacting with the ports and recesses in the seat portion 87. The main reservoir pipe 93 is connected to the portion 79 and leads to a passage 94 which communicates with the supply passage 24 of the feed valve. It also leads to the space 95 above the rotary valve. The discharge passage 25 of the feed valve leads to a passage 96 which terminates in a port in the seat of the rotary valve, and which in running position, Fig. 1, is connected by cavity 97 with a passage 98 leading to the space above the equalizing piston 99 and with a passage 101 leading to the brake pipe 102. Passage 101 is connected by a short passage 103 with the space below equalizing piston 99. The brake pipe 102 is connected by a branch or control pipe 104 with a threaded connection 75 and consequently with the passage 74 in the feed valve.

It is unnecessary to discuss the action of the engineer's brake valve except in those details which are related to the operation of the feed valve.

In running position, shown in Fig. 1, brake pipe pressure communicates by way of pipe 104 and passage 74 with the space above the diaphragm 54 and when this pressure is below the value determined by the adjustment of the spring 64 the diaphragm 54 is forced upward and seals against the seat 53. It follows that choke port 40 vents the space above the piston 36 to atmosphere and the spring 42 forces the piston 36 to its uppermost position, allowing the valve 19 to open. The opening of this valve permits main reservoir pressure to flow by way of pipe 93, passages 94 and 24, through valve seat 22 to passage 25. As explained this communicates with passage 96 which is connected by cavity 97 to passage 101 and consequently with the brake pipe 102. As brake pipe pressure builds up it will approach the value for which spring 64 is set and when this occurs diaphragm 54 will move away from seat 53 and brake pipe air will flow by way of choke 55 to the space above the piston 36. Since the capacity of the choke 55 is greater than that of the choke 40, this flow will occur sufficiently rapidly to increase the pressure above the piston 36 and thus force the piston 36 downward to move the valve 19 in a closing direction. When the diaphragm 54 moves away from the valve seat 53 the area exposed to pressure is increased by the area within the valve seat so that rapid, full opening is secured. By locating the choke 55 close to the valve seat, quicker action is secured, but a similar effect is had if the choke 55 be located at other points in the passage 45. The action may be such as to cause the valve 19 to close and open at short intervals, but the tendency is to approach an adjustment of the valve 19 which will feed air to the brake pipe at a gradually reduced or tapering rate, with final closing of the valve 19 when the proper brake pipe pressure has been established.

When the engineer's brake valve is moved to release position (see Fig. 2) main reservoir air flows from the space 95 by way of port 105 and the rotary valve 92 and port 98 to the space above the equalizing piston 99. At the same time air will flow by way of the port 106 and port 101 to the brake pipe 102. The effect is to flood the brake pipe, that is, to raise its pressure above the value determined by the setting of spring 64. It follows that in a very short time the diaphragm 54 will move downward and the feed valve 19 will close. Until this occurs the main reservoir air will flow by way of ports 24, 25, 96 and cavity 107 in the rotary valve 92, to the warning port 108. After the feed valve 19 closes discharge through the warning port will be continued by brake pipe air flowing through control pipe 104, choke 70, passage 25, and ports 96, 107, 108. This is an important feature and is the principal object in using the choke port 70. If the choke port 70 were not used the warning port would not function throughout the time that the engineer's brake valve remains in full release position. The choke port 70 supplies air from the brake pipe to perform the warning function even when the feed valve is closed.

Check valve 50 prevents back flow of main reservoir air through choke 70 to the brake pipe. In service reductions, if the brake pipe leakage is small, such flow would be sufficient occasionally to cause undesired release.

It is obvious that the invention may be embodied in various specifically different forms and no limitation to the specific structure illustrated is implied.

What is claimed is,—

1. The combination of a main reservoir pipe; a brake pipe; an engineer's brake valve adjustable to perform the ordinary release and running functions and including a feed valve discharge passage and a warning port which are connected in release position, and a brake pipe port which is connected with the feed valve discharge port in running position; a feed valve having a regulating diaphragm which controls its action, said valve being connected with the engineer's brake valve in such manner as to feed air with reduction of pressure, from the main reservoir pipe to said feed valve discharge port; a direct pressure transmitting connection between the brake pipe and said diaphragm; and a bleed connection from the last named connection to said feed valve discharge passage.

2. The combination of a main reservoir pipe; a brake pipe; an engineer's brake valve adjustable to perform the ordinary release and running functions and including a feed valve discharge passage and a warning port which are connected in release position, and a brake pipe port which is connected with the feed valve discharge port in running position; a feed valve having a regulating diaphragm which controls its action, said valve being connected with the engineer's brake valve in such manner as to feed air with reduction of pressure from the main reservoir pipe to said feed valve discharge port; a direct pressure transmitting connection between the brake pipe and said diaphragm; a bleed connection from the last named connection to said feed valve discharge passage; and a check valve in said bleed connection arranged to permit flow in the direction indicated and to preclude back flow.

3. The combination of a main reservoir pipe; a brake pipe; an engineer's brake valve adjustable to perform the ordinary release and running functions, said engineer's brake valve including a feed valve discharge port and a warning port which are connected in release position, and a brake pipe port which is connected with said feed valve discharge port in running position; a feed valve controlling the passage of air from the main reservoir to the feed valve discharge passage; a pressure motor for actuating said feed valve; a pressure actuated diaphragm; an annular valve seat with which said diaphragm coacts as a valve to control the operation of said pressure motor; a direct pressure transmitting connection between said diaphragm and the brake pipe; and a bleed port from the last named connection to said feed valve discharge passage.

4. The combination of a main reservoir pipe; a brake pipe; an engineer's brake valve adjustable to perform the ordinary release and running functions, said engineer's brake valve including a feed valve discharge port and a warning port which are connected in release position, and a brake pipe port which is connected with said feed valve discharge port in running position; a feed valve controlling the passage of air from the main reservoir to the feed valve discharge passage; a pressure motor for actuating said feed valve; a pressure actuated diaphragm; an annular valve seat with which said diaphragm coacts as a valve to control the operation of said pressure motor; a direct pressure transmitting connection between said diaphragm and the brake pipe; a bleed port from the last named connection to said feed valve discharge passage; and a check valve in said bleed connection arranged to permit flow in the direction indicated and to preclude back flow.

5. In a pressure regulating feed valve, the combination of a casing or body; a valve having a stem; a piston having a piston rod in thrust relation with the stem of said valve for actuating the valve; a cylinder bushing in which said piston works; a spider in supporting relation to said cylinder bushing and having a hub portion seated in a recess in said body, said spider serving to guide said piston rod; means supported by said hub portion for guiding said valve stem and resisting leakage along the same; releasable means for locking said bushing and spider in place; a seat for said valve; and pressure actuated means for controlling the action of said piston.

6. In a pressure regulating feed valve, the combination of a casing or body; a valve having a stem; a piston having a piston rod in thrust relation with the stem of said valve for actuating the valve; a cylinder bushing in which said piston works; a spider in supporting relation to said cylinder bushing and having a hub portion seated in a recess in said body; means supported by said hub portion for guiding said valve stem and piston rod and for resisting leakage along the valve stem; releasable means for locking said bushing and spider in place; a removable seat for said valve; a member removably mounted in said body and serving to retain said seat in position; and pressure actuated means for controlling the action of said piston.

7. In a pressure regulating feed valve, the combination of a casing or body; a valve having a stem; a piston having a piston rod in thrust relation with the stem of said valve for actuating the valve; a cylinder bushing in which said piston works; a spider in supporting relation to said cylinder bushing and having a hub portion seated in a recess in said body; means supported by said hub portion for guiding said valve stem and piston rod and for resisting leakage along the valve stem; releasable means for locking said bushing and spider in place; a removable seat for said valve; a member removably mounted in said body and serving to retain said seat in place, said seat and member being so dimensioned as to permit withdrawal of said valve upon the removal of said member and seat; and pressure actuated means for controlling the action of said piston.

8. The combination of a hollow body having openings at opposite sides thereof; a motor unit removable through one side and including a piston with rod, a cylinder bushing, and a spider in centering and thrust engagement with the bushing and body and having a guide for a valve stem; a valve unit removable through the other side of the body and including a valve seat and valve, said valve having a stem in telescoping thrust relation with said piston rod; means for sealing the openings and retaining said units in place; and pressure actuated means for controlling the action of said piston.

9. The combination of a hollow body having openings at opposite sides thereof; a motor unit removable through one side and including a piston with a rod, a cylinder bushing, and a spider in centering and thrust engagement with the bushing and body and having a guide for a valve stem; a valve unit removable through the other side of the body and including a valve seat and valve, said valve having a stem capable of entering into thrust engagement with said piston rod; means for guiding said piston rod; means for sealing the openings and retaining said units in place; and pressure actuated means for controlling the action of said piston.

10. The combination of a hollow body having openings at opposite sides thereof; a motor unit removable through one side and including a piston with rod; a cylinder bushing, and a spider in centering and thrust engagement with the bushing and body and having a guide for a valve stem; a valve unit removable through the other side of the body and including a valve seat and valve, said valve having a stem guided in the valve guide of said spider and in telescopic thrust relation with said piston rod; means for sealing the openings and retaining said units in place; pressure actuated means for controlling the action of said piston; and drain passages formed in said spider and body and serving to vent and drain the space between the piston and spider and between said valve stem and piston rod.

11. In a feed valve, the combination of a diaphragm; means for yieldingly loading said dipahragm; a removable valve seat with which said diaphragm coacts as a valve; and stops located beyond the range of motion permitted the diaphragm by the valve seat and serving to prevent excess motion of the diaphragm when the valve seat is removed.

12. The combination of a feed valve; a cylinder; a piston therein for actuating the feed valve, there being a choke port for slowly venting from the cylinder pressure fluid acting on the piston; a narrow annular valve seat controlling a passage leading to said cylinder, there being a choke port interposed in said passage closely adjacent said seat, and having a capacity in excess of that of the first choke port; a diaphragm coacting as a valve with said annular valve seat; means for loading said diaphragm; and means for subjecting said diaphragm to the pressure of fluid discharged through said feed valve.

13. The combination of a feed valve; a cylinder; a piston therein for actuating the feed valve, there being a choke port for slowly venting from the cylinder pressure fluid acting on the piston; a narrow annular valve seat controlling a passage leading to said cylinder, there being a choke port interposed in said passage closely adjacent said seat, and having a capacity in excess of that of the first choke port; a diaphragm coacting as a valve with said annular valve seat; means for loading said diaphragm; and means including a choke port for forming a restricted pressure fluid conveying connection between said diaphragm and the discharge side of said feed valve.

14. The combination of a feed valve; a cylinder; a piston therein for actuating the feed valve, there being a choke port for slowly venting from the cylinder pressure fluid acting on the piston; a narrow annular valve seat controlling a passage leading to said cylinder, there being a choke port interposed in said passage, and having a capacity in excess of that of the first choke port; a diaphragm coacting as a valve with said annular valve seat; means for loading said diaphragm; and means including a choke port and check valve for forming a one-way restricted flow connection from said diaphragm chamber to the discharge side of said feed valve.

15. In a feed valve, the combination of a hollow body having an open side; a spider having a hub in centering and thrust engagement with said body, said spider including a portion which serves as a baffle across the interior of the body; a cylinder bushing in centering engagement with the body and in centering and thrust engagement with the spider, said bushing being adjacent the open side of said body; a closure for the open side of said body entering into centering and thrust engagement with said bushing; a piston slidable in said bushing and having a stem; and a valve having a stem guided in said hub and in telescopic thrust engagement with said piston stem.

16. In a feed valve, the combination of a hollow body having an open side; a spider having a hub in centering and thrust engagement with said body, said spider including a portion which serves as a baffle across the interior of the body; a cylinder bushing in centering engagement with the body and in centering and thrust engagement with the spider, said bushing being adjacent the open side of said body; a closure for the open side of said body entering into centering and thrust engagement with said bushing; a piston slidable in said bushing and having a stem; means for guiding said stem; and a valve having a stem guided in said hub in thrust engagement with said piston stem.

17. The combination with a feed valve body, of two pairs of attaching lugs spaced apart to afford an interval between the lugs, said lugs being formed in pairs with alined openings, whereby the feed valve may be mounted by use of short studs which pass through one pair of lugs, or long studs which pass through both pairs of lugs.

18. The combination of a main reservoir pipe; a brake pipe; a feed valve supplied by the main reservoir pipe; an engineer's valve having a warning port and adapted in running position to connect the feed valve to feed the brake pipe and in release position to connect the main reservoir directly with the brake pipe, and the feed valve with the warning port; and a by-pass connection from the brake pipe to the discharge side of the feed valve whereby a warning flow occurs even when the feed valve closes.

19. The combination of a main reservoir pipe; a brake pipe; a feed valve suppplied by the main reservoir pipe; an engineer's valve having a warning port and adapted in running position to connect the feed valve to feed the brake pipe and in release position to connect the main reservoir directly with the brake pipe, and the feed valve with the warning port; a by-pass connection from the brake pipe to the discharge side of the feed valve whereby a warning flow occurs even when the feed valve closes; and a check valve for preventing reverse flow through the last named connection.

20. The combination of a valve body; a valve therein having a tubular stem; an elongated tubular guide for the stem; a cylinder; a piston therein; a rod connected with the piston and extending within said stem and substantially through the entire length of the guide into thrust relation with the valve; and pressure responsive means for varying the effective pressure on said piston.

21. In a device of the class described, the combination of a valve body; a valve therein having a tubular stem; an elongated tubular guide for the stem; and an actuating rod for said valve extending within said stem and substantially through the entire length of the guide into thrust relation with the valve.

22. The combination of a hollow body having openings at opposite sides thereof; a motor unit removable through one side and including a piston with rod, a cylinder bushing, and a spider in centering and thrust engagement with the bushing and body and having a guide for the valve stem; a unit removable through the other side of the body and including a valve seat; means for sealing said openings and retaining said units in place; and a valve guided in said guide in thrust relation with said piston rod and in position to coact with said seat, said valve being so dimensioned relatively to said spider and seat that it may be withdrawn from said body upon the removal of either unit.

23. The combination of a hollow body having openings at opposite sides thereof; a motor unit removable through one side and including a piston with rod, a cylinder bushing, and a spider in centering and thrust engagement with the bushing and body and having a guide for the valve stem; a unit removable through the other side of the body and including a valve seat; means for sealing said openings and retaining said units in place; and a valve guided in said guide in thrust relation with said piston rod and in position to coact with said seat, said valve being removable from said body upon the withdrawal of said motor unit.

24. The combination of a hollow body having openings at opposite sides thereof; a motor unit removable through one side and including a piston with rod, a cylinder bushing, and a spider in centering and thrust engagement with the bushing and body and having a valve stem guide through substantially the entire length of which said piston rod projects; a unit removable through the other side of the body and including a valve seat; means for sealing the openings and retaining said units in place; a valve having a tubular stem guided in said guide and in telescoping thrust engagement with said piston rod; and automatic means for controlling the action of said piston.

25. In a feed valve, the combination of a housing; a diaphragm mounted in said housing; means for yieldingly loading said diaphragm; a ported valve seat removable from said housing; means coacting with said valve seat and rendered effective by the flexure of said diaphragm to open and close the port in said seat; and stops located in said housing beyond the range of motion permitted the diaphragm in its normal action, and serving to prevent excess motion of the diaphragm when the valve seat is removed.

26. The combination of a feed valve; a cylinder; a piston therein for actuating the feed valve, there being a choke port for slowly venting from the cylinder pressure fluid acting on the piston; a narrow annular valve seat controlling a restricted passage leading to said cylinder, said passage having a capacity in excess of that of said choke port; a diaphragm coacting as a valve with said annular valve seat; means for loading said diaphragm; and means for subjecting said diaphragm to the pressure of fluid discharged through said feed valve.

27. In a feed valve, the combination of a hollow body having an open side; a spider having a hub in centering and thrust engagement with said body, said hub being provided with an elongated guide for a valve stem; a cylinder bushing in centering engagement with the body and in centering and thrust engagement with the spider, said bushing being adjacent the open side of said body; a closure for the open side of said body entering into thrust engagement with said bushing; a piston slidable in said bushing and having a rod which extends through substantially the entire length of the valve stem guide in said spider; and a valve having a tubular stem guided in said guide and in telescopic thrust engagement with said piston rod.

In testimony whereof I have signed my name to this specification.

CHARLES A. CAMPBELL.